Sept. 19, 1961 R. F. ARNOLDY 3,000,094
METHODS OF PRODUCING HARDFACED SURFACES
Filed Feb. 18, 1957

Roman F. Arnoldy
INVENTOR.

BY Hayden & Pravel

ATTORNEYS

3,000,094
METHODS OF PRODUCING HARDFACED SURFACES
Roman F. Arnoldy, 3827 Childress, Houston, Tex.
Filed Feb. 18, 1957, Ser. No. 640,780
8 Claims. (Cl. 29—528)

This invention relates to methods of producing hardfaced surfaces, and particularly to methods of producing welded-on facings on a base material without the danger of cracking the base material.

In the production of hardfaced surfaces or welded-on facings by welding deposit methods, the weld deposit shrinks as it cools and such shrinkage results either in warpage of the part or base material being faced or in uncontrolled cracking of the facing. When the part or material becomes warped, it is sometimes straightened to return it to as near its original shape as possible, and, as a result, uncontrolled cracking of the facing occurs. In some instances, to avoid the warpage of the part or material being faced, the part or base material is held or restrained so that it cannot warp, but again, the welded-on facing cracks in an uncontrolled manner. Such uncontrolled cracking almost always results in the formation of only a very few cracks, and in many cases in the formation of only a single crack in the welded-on facing. Since there are so few of the cracks formed in the facing, the stress resulting from the straightening or from the restraint during the shrinkage of the welded-on facing is concentrated at the crack or cracks. Also, each crack constitutes a sharp notch which concentrates the stresses at each crack. The notch effect of the crack or cracks plus the magnitude of the stresses because of the paucity of the cracks in the facing usually causes an extension or progression of the crack or cracks from the welded-on facing through the part or base material being faced, with the resultant breakage of the part or material itself.

Also, particularly in the case of flat or asymmetrical welded-on facings, wrinkles, high spots and other surface irregularities are created in the facing so that when the facing is finished to flatness by grinding, the facing is removed, or nearly removed, in some areas.

In the usual case, the welded-on facing or deposit is applied in order to provide a wearing surface which is much harder than the original surface of the part or material to which the facing or deposit is applied so that the wear life of the part or material is increased. For example, the facing or deposit may be applied on machine ways or any similar surface which is subjected to sliding or abrasive action tending to wear into or to wear away such surface during use. Therefore, it will be appreciated that the removal of all or nearly all of the facing in certain areas is a further disadvantage of the prior known methods of applying welded-on facings.

A principal object of this invention is to provide a new and improved method of applying a welded-on facing or deposit wherein warping of the base material as a result of the application of such facing is eliminated or is substantially eliminated.

It is another object of this invention to provide a new and improved method of applying a welded-on facing or deposit on a part or material without creating cracks in the part or material.

Another object of this invention is to provide a new and improved method of applying a welded-on facing or deposit on a part or material without creating any appreciable high spots, wrinkles or other surface irregularities in the facing so that upon a grinding of the facing to flatness, localized removal or substantial removal of the facing is avoided.

An important object of this invention is to provide a new and improved method of welding a facing or deposit on a base material or element in such a manner that controlled cracking of the facing or deposit is obtained to distribute any stresses to a relatively large number of cracks for thereby diminishing or eliminating the danger of cracking or warping the base material or element.

Another important object of this invention is to provide a new and improved method of welding a facing or deposit on a base material or element in such a manner that controlled cracking of the facing or deposit is obtained, whereby the formation of high spots or other surface irregularities in the facing is prevented so that upon a subsequent grinding or finishing to flatness, the facing is not removed, or nearly removed in localized areas.

A particular object of this invention is to provide a new and improved method of welding a hardfacing or deposit on one or more surfaces of a base material wherein controlled cracking of the facing or deposit is induced by preventing welding at certain areas or by creating planes of weakness vertically through the facing or deposit to thereby prevent cracking or warpage of the base material.

Another object of this invention is to provide a new and improved method of applying a facing to a base material wherein cracking of the facing in a predetermined pattern such as a grid is induced to prevent warping or cracking of the base material.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
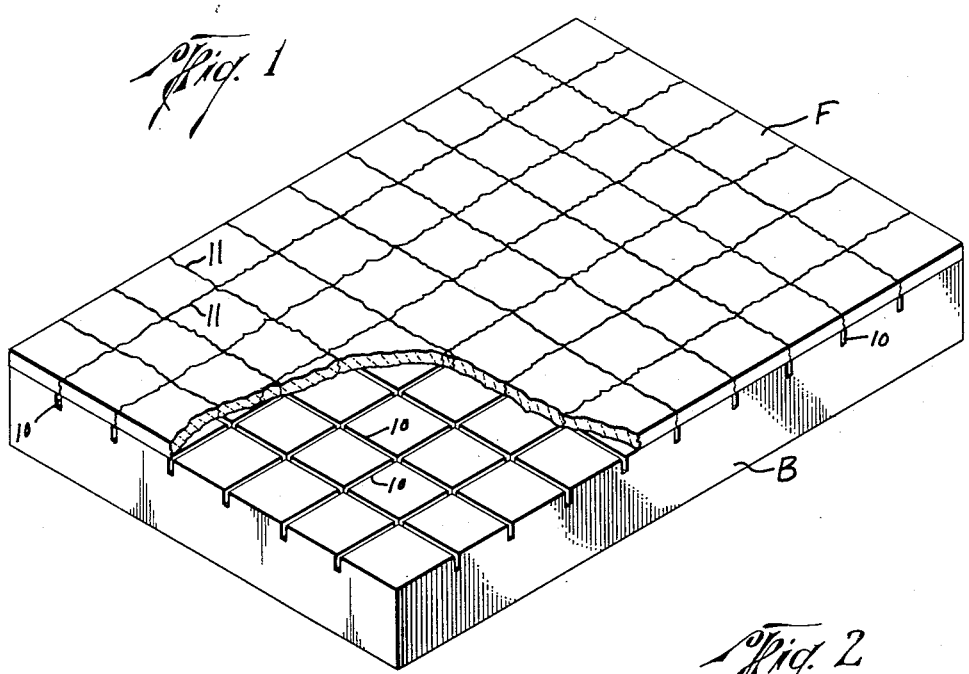
FIG. 1 is an isometric view, partly in section, illustrating the product produced by carrying out one form of the method of this invention.

In the drawings, the letter B designates generally the base material, part or element to which a welded-on facing F is to be applied. As will be explained more in detail, the facing F is welded or bonded to the base material B using well-known manual or automatic welding or casting procedures, but the welding or casting of the facing F to the base material B is prevented at certain predetermined areas, or substantially vertical planes of weakness are created through the facing F at certain predetermined areas or planes. By preventing the welding of the facing F to the base material B or by creating such planes of weakness in the facing F at such predetermined areas, cracking of the facing F is induced to thereby prevent warping or cracking of the base material B. If, however, the base material B is relatively thin, it may warp during the cooling and shrinking of the facing F, in which case the cracks are formed in said predetermined areas of the facing F upon a subsequent application of heat and pressure to straighten the base material B to as near its original condition as possible. In some instances, with a relatively thin base material, it may be preferable to hold the base material against warpage, in which case the cracking of the facing F occurs during the cooling and shrinking of the facing F.

Considering the invention more in detail, it should be pointed out that the method and the product of this invention are not limited to the flat base material B as illustrated in the drawings, but instead, the invention may be used with a base material B which is of any shape and which has a surface or surfaces to which the facing F is to be welded. The particular material of which the base material B is formed is immaterial so long as it is capable of having a relatively hard facing material secured thereto, preferably by welding or casting. Since welding and casting are the preferred methods for bonding the hard facing to the base B, the base B would usually be steel, iron or alloys thereof, as will be understood by those skilled in the art. The invention is particularly suitable for producing welded-on facings which are flat or asymmetrical, but there are instances in which even symmetrical shapes of the facing may be used in carrying out the method of this invention. For example, a welded-on facing may be applied to a cylindrical or tubular material or element, and similarly, solid steel bars of various diameters may be faced using the method of this invention. Primarily, of course, the invention is particularly useful where there are no balancing set of stresses created during the cooling and consequent shrinking of the welded-on facing, because if the stresses are balanced and the part is of such thickness and section that it can contract as the facing shrinks, an example of which is a tube, cracking of the facing does not usually result during such cooling and shrinkage. There are many sets or combinations of conditions which would produce cracking of the base B as a result of applying a hard facing F thereto without following the teachings of this invention. In fact, cracking of the base material B when using the methods known prior to this invention is extremely common and from a practical standpoint, it would be impossible to define the numerous possible sets or combinations of conditions which would produce cracking of the base material B if the method of this invention is not employed. An illustration of one set or combination of conditions which would almost always produce cracking of the base B if the method of this invention is not followed is as follows: the facing F would be an alloy of about 1/8" thickness having 18% chromium, 2.5% carbon and the balance iron; the base would be a low carbon steel of about 5/8" thickness. If the method of this invention as described herein is followed, there would be no cracking of the base B under such set of conditions.

In the form of the invention shown in FIG. 1, the base material or element B is formed with a plurality of narrow slots or grooves 10 which are preferably arranged in a grid or grid-like pattern, as shown in FIG. 1. Such slots or grooves 10 are relatively narrow and deep and in the usual case they will be rounded or flat on the bottom rather than V-shaped. The facing F may be of any hard material which is relatively hard as compared to the base material B, and it may be, for example, tungsten carbide or other similar hardfacing material. The tungsten carbide would be applied to the base in the conventional manner by using a tube of mild steel to confine the tungsten carbide granules so that the mild steel tube is melted during welding to serve as a matrix for the tungsten carbide. The facing F is applied to the base material B by any of the well-known welding procedures. Thus, the facing F may be applied by the procedure known as "spray welding" wherein a metal powder such as a conventional nickel base alloy which serves as the hard facing is applied to the base material B when it is cold, and then the powder is heated up and fused to weld to the base material B. An example of one type of conventional nickel base alloy includes the following components as disclosed in "Metal Surface Treatments Manual" (copyright 1949): 71% nickel; 17% chromium; 0.3% silicon; 3.7% boron; 3% carbon; 4% iron, and 1% impurities. The facing F may also be applied by the torch application of alloys wherein a torch such as an acetylene torch is used with a bare melt rod. The manual arc method in which a coated electrode is used may also be employed in this invention for applying the facing F to the base material B. Other examples of well-known manual processes for welding the facing F to the base material B are the "tungsten-inert gas method" and the "atomic hydrogen method," both of which are well-known and need no detailed description. The automatic welding processes, such as the submerged melt welding under a granular flux and the inert gas welding under a blanket of gas, may also be employed to apply the hardening F to the base material B.

In any event, the facing F is welded to the base material B on the entire surface to which the facing F is applied except in the areas over the slots or grooves 10 in the base material B. The lack of penetration into such slots or grooves 10, and the entrapped air in such slots or grooves 10 will produce porosity which causes a plane of weakness substantially vertically through the facing F which thereby induces cracking of the facing F directly above the slots or grooves 10, and such cracks are indicated in FIG. 1 by a numeral 11. Thus, the cracks 11 in the facing F are created in a predetermined pattern in accordance with the predetermined pattern of the slots or grooves 10. If the base material B is relatively thin, it may be held or restrained against warpage during the cooling and cracking of the facing F. If the base material B is sufficiently thin so that in the absence of restraint, it does warp as the facing F cools and shrinks, the cracking of the facing F to form the cracks 11 occurs upon the application of subsequent external pressure and heat to the base material B to straighten same to as near its original condition as possible. With a base material B and a facing F of the normal thicknesses for hardfacing, the formation of the cracks in the facing F occurs as the facing F cools and shrinks and, therefore, formation of the cracks prevents the transmission of the shrinking forces to the base material B in sufficient amounts to cause warping of the base material B, whereby warping of the base material B is thus prevented.

When the slots or grooves 10 are arranged in a grid or grid-like pattern, such as illustrated in FIG. 1 of the drawings, individual small squares of the hardfacing material are produced by the formation of the cracks 11 and such small squares are welded onto the base material only but not to the other squares. Regardless of the particular pattern formed by the slots or grooves 10, it is important that the number of such slots or grooves 10 be sufficient to distribute the stress accumulation caused by the shrinkage of the facing F during cooling to all of the cracks so that the stress accumulation at each crack is relatively small and is of an insufficient magnitude to result in a progression or extension of the crack from the facing F to the base material B. The grid-like pattern illustrated in FIG. 1 which produces the separate welded squares of the facing F is especially desirable because of the uniform area distribution of the cracks 11. Such uniform area distribution of the cracks makes possible the forming of desired shapes or flat areas after welding because the faced area will deform in a uniform manner throughout an area in much the same way as a bar of uniform cross-section bends on application of pressure. It should also be pointed out that when the facing F is applied to areas which are subject to wear, such as machine ways, the cracks 11 will act as reservoirs for grease or lubricant which is to be delivered to the mating surface during use. It can thus be seen that there are many important advantages which result from the method of this invention.

Figure 2:
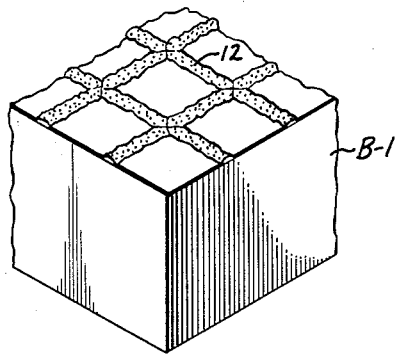
FIG. 2 is a partial isometric view to illustrate an intermediate form of the product used in carrying out another form of the method of this invention.

A modified form of the method of this invention is illustrated by the product of FIG. 2. In such modified method, a gas-producing material 12 is applied to the base material or element B–1. The base material B–1 is in all respects identical with the base material B except that it does not have the slots or grooves 10 formed therein. Instead, the facing F is prevented from bonding to the base material B–1 by means of the gas-producing material 12 which is arranged preferably in a grid or grid-like pattern similar to the pattern disclosed in FIG. 1 for the slots or grooves 10. The gas-producing material 12 may be any substance which is capable of producing gas on the application of the weld coating or facing F thereto. For example, various metallic oxides such as iron oxide may be used for the gas-producing material 12. In fact, any material in which the oxygen is available to combine with the carbon in the metal or in the welding means will be suitable because the carbon monoxide or carbon dioxide gas will thereby be produced. The formation of the gas induces defects in the facing by creating a porous area or plane of weakness in the facing F corresponding to the grid or other predetermined pattern formed by the gas-producing material 12.

Thus, in carrying out the modified method illustrated by FIG. 2, the gas-producing material 12 is applied to a surface or surfaces of the base material B–1 by any of the above described welding processes. The gas, such as the carbon monoxide or the carbon dioxide, is produced as the facing F is welded so as to cause the porosity in the facing in the pattern corresponding to the pattern of the gas-producing material 1. During the cooling of the facing F, the cracks develop in the welded-on facing to thereby prevent warping of the base B–1, and the appearance of such facing is substantially the same as the facing F illustrated in FIG. 1. If the base material B–1 is relatively thin and warps, such cracks will be formed upon the application of external pressure and heat to the base B–1 during the straightening thereof, and again, such cracks will develop in the same pattern as the predetermined pattern of the gas producing material 12. It can thus be seen that all of the advantages and improved results described above in connection with the method of FIG. 1 are also present in employing the modified form of the invention described and illustrated in connection with FIG. 2.

Figure 3:
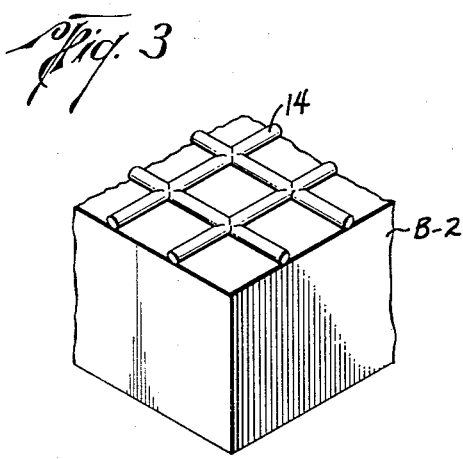
FIG. 3 is a view similar to FIG. 2, but illustrating another modified form of the method of this invention.

A still further modified method of this invention is illustrated by the product shown in FIG. 3. The method relating to FIG. 3 is substantially the same as that described above in connection with FIGS. 1 and 2, except that the welded-on facing F is prevented from welding or bonding to the base B–2 by the use of a screen or wires 14 which are arranged in a grid or grid-like pattern and which are formed of steel or any other material which will not melt when subjected to the temperature of the molten deposited metal. The base B–2 is identical with the base B except that the slots or grooves 10 are not formed in the base B–2. The screen or wires 14 serve the same purpose as the grooves 15, however, since they also prevent the welding of the facing F or create planes of weakness substantially vertically through the facing in the predetermined pattern provided by the screen or wires 14, so that cracking of the facing F is accomplished to provide cracks in the facing similar to the cracks 11 of the facing F as illustrated in FIG. 1. Thus, in carrying out the method using the form illustrated in FIG. 3, the wires or screen 14 are applied to the surface of the base material B–2 which is to be faced with the welded-on facing F. The screen or wires 14 may be arranged in a square grid such as corresponds with the slots or grooves illustrated in FIG. 1, or in any other desired pattern which will preferably produce a uniform area distribution of the cracks in the facing F in the final product.

The facing F is applied in any of the various ways enumerated above in connection with the form of the invention shown in FIG. 1. Since the wires or screen 14 prevent the facing F from welding to the base material B–2 or alloy with the facing to induce a defect in the facing or to form a vertical plane of weakness through the facing, cracking of the facing F occurs immediately above the wires or screen 14 as the facing F cools and shrinks, and such cracking prevents warping of the base B–2. If the base B–2 is relatively thin and warps during the shrinkage of the facing F, such cracks will be formed in the facing F upon subsequent straightening of the base material B–2. The hardfacing of the final product will have substantially the same appearance as that illustrated in FIG. 1, and therefore will have cracks corresponding to the cracks 11 in the facing F. Also, it will be evident that the same advantages and results described above in connection with the form of the invention of FIG. 1 will also be provided by the form of the invention illustrated in connection with FIG. 3.

It will be understood that the invention is not limited to the several specific methods disclosed herein, but such methods are merely examples of the basic method of this invention. In the foregoing description of the invention, it has been pointed out that the method of this invention, in its various forms, prevents the warping of the base material for normal thicknesses of the base material and facing. The term "normal thickness" as used herein may vary to such a large extent that it is impractical to define specific limits on such term, particularly since the tensile strength of the base material and the facing applied thereto are also factors in determining the thicknesses of the base material and the facing which may be employed without creating warping of the base material. However, to illustrate the invention, the following example will serve to indicate the meaning intended for the term "normal thickness" herein.

Thus, with a base material of low carbon steel and with a facing metal having 23% chromium and 3½% carbon, there would be substantially no warping of the base material if it is at least ⅝ inch thick, and if the facing is not more than ⅛ inch thick. On the other hand, with all other conditions the same as above, if the base material is only about ½ inch thick, there will be definite warpage thereof. As explained previously, such warpage is prevented when using the method of this invention. If all of the conditions set forth above remain the same, except that the base material includes 5% chromium in the steel, substantially no warping occurs with a base material that is only ⅜ inch thick. It is believed that such examples suffice to show the extent of the variables involved in carrying out the method of this invention to prevent warping of the base material.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A method of applying a hard facing of a relatively brittle material to a base of a relatively ductile material by welding or the like without causing cracking of the base material and without forming undesirable wrinkles, high spots or other surface irregularities in the facing, comprising the steps of, providing means with the relatively ductile base material in a predetermined pattern of substantially uniformly spaced lines for preventing the welding of the relatively brittle hard facing to said relatively ductile base material at said spaced lines of said predetermined pattern, and then applying the relatively brittle hard facing to said relatively ductile base material and said means in the predetermined pattern in such thickness relative to the thickness of the base material that either cracking or warping of the base material would normally occur to bond said facing to said base material except at said spaced lines of said predetermined pattern so that substantially vertical planes of weakness are created in said facing at said predetermined pattern which induces cracking of the facing in said predetermined pattern without causing cracking or warping of said base material.

2. A method of applying a hard facing of a relatively brittle material to a base of a relatively ductile material by welding or the like without causing cracking of the base material, comprising the steps of, welding the relatively brittle facing on a surface of the relatively ductile base material in such thickness relative to the thickness of the base material that either cracking or warping of the base material would normally occur, and providing a substance between the facing and the base material which is present in certain selected areas during welding which creates planes of weakness substantially vertically through said facing adjacent to said selected areas whereby the shrinking forces imparted to the facing from cooling same cause said facing to crack along said planes of weakness.

3. A method of applying a hard facing of a relatively brittle material to a base of a relatively ductile material by welding or the like without causing warping or cracking of the base material and without forming undesirable wrinkles, high spots or other surface irregularities in the facing, comprising the steps of, forming a series of narrow grooves in a surface of the base material, welding the facing on said surface of the base material and over said grooves in such thickness relative to the thickness of the base material that either cracking or warping of the base material would normally occur, and entrapping air in said grooves during said welding to create planes of weakness in the facing so that crack are induced in the facing above said grooves only whereby a controlled cracking of the facing is obtained without cracking or warping the base material.

4. The method set forth in claim 3, wherein said series of narrow grooves are formed in a grid-like pattern.

5. A method of applying a hard facing of a relatively brittle material to a base of a relatively ductile material by welding or the like without causing cracking of the base material and without forming undesirable wrinkles, high spots or other surface irregularities in the facing, comprising the steps of, applying a metallic oxide in a predetermined pattern to a surface of the base material, welding the facing to said surface of the base material in such thickness relative to the thickness of the base material that either, cracking or warping of the base material would normally occur, and said metallic oxide producing gas during the welding to induce defects in the welding of said facing to said base material in the vicinity of said metallic oxide whereby cracking of the facing is induced along said defects without creating cracks in the base material.

6. The method set forth in claim 5, wherein said metallic oxide is applied in a grid-like pattern.

7. A method of applying a hard facing of a relatively brittle material to a base of a relatively ductile material by welding or the like without causing cracking of the base material and without forming undesirable wrinkles, high spots or other surface irregularities in the facing, comprising the steps of, applying a plurality of wires in a predetermined pattern to a surface of said base material, said wires being formed of a material which is not melted during welding, and thereafter applying said facing to said surface and said wires for effectively welding said facing to said surface of said base material except at the areas covered by said wires in such thickness relative to the thickness of the base material that either cracking or warping of the base material would normally occur but such areas of the facing cracking without cracking the base material due to the presence of said wires and the consequent planes of weakness thereby created in the facing.

8. The method set forth in claim 7, wherein said wires are arranged in a grid-like pattern on said surface of the base material.

References Cited in the file of this patent
UNITED STATES PATENTS

| | | |
|---|---|---|
| 815,985 | Strauss | Mar. 27, 1906 |
| 2,191,469 | Hopkins | Feb. 27, 1940 |
| 2,191,472 | Hopkins et al. | Feb. 27, 1940 |
| 2,766,514 | Adams | Oct. 16, 1956 |